United States Patent [19]

Haven et al.

[11] 4,423,191

[45] Dec. 27, 1983

[54] HIGH FREQUENCY ELECTRIC FIELD CURING OF POLYMERIC COMPOSITES

[75] Inventors: Richard E. Haven, Mountain View, Calif.; Nam P. Suh, Sudbury, Mass.

[73] Assignee: Massachusetts Institute of Technology, Cambridge, Mass.

[21] Appl. No.: 259,657

[22] Filed: May 1, 1981

[51] Int. Cl.$^3$ .................................................. C08L 67/06
[52] U.S. Cl. ..................................... 525/169; 264/26; 523/300; 524/425; 524/513; 524/527; 525/165
[58] Field of Search ............................ 204/169; 264/26; 260/40 R; 525/165, 169; 524/425, 513, 527; 523/300

[56] References Cited

U.S. PATENT DOCUMENTS

| | | | |
|---|---|---|---|
| 3,816,574 | 6/1974 | Heller, Jr. et al. | 264/45.3 |
| 3,972,962 | 8/1976 | Williams et al. | 525/165 |
| 4,247,577 | 1/1981 | Imada et al. | 204/169 |

*Primary Examiner*—J. Ziegler
*Attorney, Agent, or Firm*—Arthur A. Smith, Jr.; George W. Neuner

[57] ABSTRACT

A method for curing a resinous composition comprising an admixture of a thermosetting resin and dielectrically lossy particles is described wherein the lossy particles have a dielectric constant substantially the same as the dielectric constant of the resin. The method comprises subjecting said admixture to a high frequency alternating electric field for sufficient time to heat the lossy particles and initiate the chemical reaction to cure the resin. Also described are shaped articles of manufacture made by curing resinous compositions in accord with the described method. Such articles have enhanced mechanical properties due to the curing process.

16 Claims, 9 Drawing Figures

HIGH FREQUENCY ELECTRIC FIELD CURING OF POLYMERIC COMPOSITES

FIELD OF THE INVENTION

This invention relates to methods for the curing of polymeric composite materials using high frequency electric fields and particularly to methods for curing reinforced thermoset composites comprising dielectrically lossy particles that provide localized heat sources to initiate the curing reaction which propagates from the heat source. The invention further relates to composite polymeric articles made by such methods.

BACKGROUND OF THE INVENTION

Applications for reinforced thermoset composites are currently limited by manufacturing technology. This is particularly true in industries where the use of light, high performance composites is important and/or critical. There is considerable interest in refining existing technologies and/or developing new composite processing techniques.

Composite processes may generally be considered as using either open or closed molds. Only closed mold techniques are discussed here because they have advantages in surface finish, capability for detailed configurations, and part to part uniformity. However, it will be realized that the discussion applies equally to open mold techniques.

Most thermoset composites are based on either polyurethanes, phenolics, polyesters, or epoxies. Of these, polyurethanes and polyesters are the most widely used due to their lower cost. Fillers are added to improve mechanical properties and aid processing. Common fillers include glass fibers, which improve mechanical properties, and mineral fillers such as calcium carbonate which reduce cost and improve flow characteristics during molding, and the like. Other fillers are frequently added but fibers and mineral fillers are used most widely and in the greatest concentrations. Based on final properties and/or cost, it may be desirable to incorporate up to 60-70 percent by volume of these components.

Processing techniques aim to produce accurate, high quality parts from these compositions in minimal cycle times. It is also desirable to maximize the filler loadings a process can handle which will increase the variety of parts that can be made.

One of the fastest growing closed mold processes is reaction injection molding (RIM). RIM is a process where reacting components are mixed intimately and loaded into molds. Most of the resin systems currently used are based on polyurethane. Extremely fast cure times, on the order of several seconds, are possible due to the high reaction rates involved. Reinforced RIM, i.e. RRIM, refers to modifying the conventional RIM process by adding reinforcements, usually glass fibers. Unfortunately, the development of this process appears constrained by inherent couplings between the mixing, forming, and curing stages.

The RRIM is limited by the amount of reinforcements that can be added. The usual procedure is to mix the fillers into the unreacted components prior to impingement mixing. The ability to pump these very viscous slurries and still obtain a high Reynolds number at the mix head restricts fiber loadings. Incorporating the fibers at any point after impingement is constrained by the fact that rapid reaction times require correspondingly rapid mixing and fiber wetting. In this respect, processes which remove the coupling between mixing and curing have a clear advantage over RRIM.

RRIM is also constrained in that there are no techniques, other than gate positioning, which exist for controlling the orientation of fibers. In this case the rapid reaction rates couple the curing and forming stages, restricting the possible forming operations. Besides limiting applications involving chopped glass fibers, this coupling particularly hinders the development of RRIM in the area of continuous filaments.

Another approach to composite processing is that used with sheet molding compound (SMC). In this process the resin, fillers (except glass fibers), and processing additives are mixed together in batches. A layer of the resulting paste is applied continuously to a polyethylene film. On top of this paste layer glass fibers, either chopped or continuous, are added. A second paste layer is applied on top of the fibers and the sandwich pressed together to form the SMC molding material. The resin, usually polyester, uses a heat activated chemistry. This decouples the mixing and curing stages, removing the problem of incorporating large amounts of reinforcements that limits RRIM. The SMC molding charge is placed in hot steel molds which simultaneously form the part and heat the resin, initiating the cross-linking reaction. The coupling between forming and curing in this process may be partially responsible for problems involving surface finish and the inability to make sections less than 40-50 thousandths of an inch thick. In addition, the conduction heating method used causes undesirably long cycle times.

A number of causes for poor SMC surface finishes have been proposed. These include nonuniform cure induced flow distortions while forming, residual stress, shrinkage in resin enriched areas, and nonuniform filler concentrations in the molding charge. The last two causes may be resolved by using low profile additives and closely controlling the composition of the molding charge. Cure induced flow distortions may be eliminated by forming in a cold mold and then heating. If the heating is applied uniformly, this approach may also permit uniform, residual stress-free curing. In contrast, conventional conductive heating inherently causes nonuniform curing and leaves residual stresses.

SMC's inability to make thin sections may be caused by either flow separation or premature curing during forming. In flow separation, only the resin flows leaving the fillers behind. One explanation contends that flow separation occurs when the resin viscosity is too low to carry the fillers in high shear conditions. Noting that temperature increases cause the resin viscosity to decrease, flow separation will be most prominent in thin sections where both shear and heat conduction from hot molds is worst. Similarly, premature curing which can prevent some section from filling is caused by excessive heating during forming and is worst in thin sections. The use of cold molds to decouple the forming and curing operations will eliminate unwanted heating and may allow thinner sections to be made.

Compared to RRIM, SMC has relatively long cycle times on the order of 1½-10 minutes. A number of costs are associated with these long cycle times including capital costs (a typical SMC press may cost one million dollars), tooling costs, and the labor costs connected with running a press. Shortening cycle times will reduce all of these costs on a per part basis. Unfortunately, SMC cycle times are restricted by the required conductive heating. Conductive heating rates are intrinsically limited by the thermal conductivity of the composite, the requirement that the mold be cooler than the composite's degradation temperature and the requirement that minimal curing take place during forming.

Other closed mold composite processes include transfer molding, bulk molding compound (BMC), thick molding compound (TMC), foam reservoir molding (FRM), and injection molding. These processes are all similar in that they contain innate coupling, similar to those discussed for SMC, which potentially limit development.

Electric field heating, particularly dielectric, has been used for many years in the polymer industry. Dielectric heating has been used to preheat charges prior to transfer molding, as a booster heater in oven cures, to melt and cure adhesive layers, and to cure resins in the pultrusion process. Microwaves have also been used, primarily in drying, but also to a limited degree in curing processes. Some specific applications where microwave drying has been applied include films, powders, filaments, foams, and pellets. In these applications, dielectric and microwave heating have been used to reduce cycle times by replacing or augmenting a limiting aspect of the existing process. For instance, U.S. Pat. No. 3,816,574 describes the use of an alternating magnetic field to heat and produce expanded foam articles. U.S. Pat. Nos. 3,640,913; 3,104,424; and 3,217,691 describe methods for preparing polymer particles for use in producing foamed polymers using high frequency alternating electric fields. U.S. Pat. No. 3,848,038 describes the use of microwave energy to dry expanded plastic.

Other uses of electric field energy in treating polymers include thermosetting of polyurethane or polysulfide sealing compositions containing particles having a dielectric constant greater than 200 as described in U.S. Pat. No. 3,936,412 and bonding plastic materials having magnetic particles at the interface to intermix materials at the interface and improve bond as described in U.S. Pat. No. 4,035,547.

The present invention involves the use of high frequency electric field to heat and cure polymeric systems, particularly for producing reinforced thermoset composite articles.

Electric field heating, to contrast in conduction heating, has very low thermal inertia permitting close control of the reaction rate. Conduction heating may be removed entirely from the dielectric process by using cold molds. Resulting advantages of heating with only electric fields include reduced cycle times, minimal heat inputs, and decoupling of forming and curing operations. Reduced cycle times result from the ability to put the required heat to initiate reaction uniformly into the resin mixture at a very fast rate, limited only by the electrical breakdown strength of the material. For the reasons noted in the discussion of SMC above, conventional conduction heating rates are inherently limited. Minimal heat inputs are possible with electric fields by heating only the part and by turning the field off once curing has been initiated. With conduction heating, unwanted heat losses continue through the curing stage and after the part has been removed from the mold. The advantages of decoupling the forming and curing steps are possible when forming in cold molds, followed by electric field initiated curing of the formed part. This approach effectively removes the time constraint from forming operations, simplifying the processing of a variety of compositions and geometries. In contrast to the conventional SMC process, uniform residual stress-free cures are possible because the curing occurs from inside. The fact that the outer surface will cure last can also result in improved surface finishes. Furthermore, since the flow of materials occurs independent of the curing process, thinner sections may be made and the thermoset chemistry modified to react at lower temperatures. This results in further gains in minimizing cycle times and reducing heat inputs.

Preferentially heating the composite system near localized internal heat sources also helps to minimize the required heat input and reduce cycle times. By such preferential heating of only part of the system, relatively low final temperatures are possible even in cases where the resin is initially heated to 200° C. This ability to heat only the resin to high temperatures, but stay below the composite's degradation temperature after the chemical exotherm has been generated and temperature nonuniformities distributed, reduces cure times.

Both electric field heating and the concept of propagation from heat sources can improve mechanical properties. As mentioned above, electric field techniques permit uniform heating and curing which will produce parts with negligible residual stress. This is the opposite of conventional conduction processes which cure from the outside in and innately generate residual stress fields which may later cause warping or accelerate failure. A further mechanical advantage is gained from the propagation concept. Propagating the chemical reactions outward from lossy fillers in accord with the present invention causes the resin to shrink around the fillers. For example, a typical polyester resin has a six to seven percent volume shrinkage. Shrinking around fillers improves resin/filler adhesion, enhancing mechanical properties.

SUMMARY OF THE INVENTION

The present invention provides a method for curing resinous compositions comprising an admixture of a thermosetting resin and dielectrically lossy particles that have a dielectric constant substantially the same as the resin, said method comprising subjecting said admixture to a high frequency alternating electric field wherein said lossy particle becomes a heat source for initiating the chemical reaction to cure the resin. A unique aspect of this method for curing resinous compositions is that the chemical reaction propagates from the lossy particles or heat sources where the reaction is locally initiated. Dielectric or microwave fields are preferably used as the energy source.

Preferably the electric field is 500 V/cm or greater and more preferably 2000 V/cm or greater cycling at a frequency of 1 MHz or greater. The electric field is preferably applied in a manner to induce substantially uniform heating of the composition of a macroscopic scale.

In one embodiment, a low temperature mold is used to hold and shape the composition during curing. The use of such low temperature molds reduces cycle time and helps to avoid reaching excessive temperatures above the degradation temperature of the composition.

The invention also provides shaped articles made from thermosetting resinous compositions in accord with the above process. Shaped articles made by the methods of this invention have improved mechanical properties due to reduction or elimination of residual stresses and enhanced resin/filler adhesion resulting from molding in accord with the methods of this invention.

DETAILED DESCRIPTION OF THE INVENTION

In accord with the present invention, a process is provided for curing resinous compositions, particularly wherein the curing of such compositions is heat activated. The resinous compositions useful in the practice of the present invention comprise a resinous material having dispersed therein dielectric loss particles which act as heat sources when placed in a high frequency alternating electric field. The chemical reaction causing curing of the resin thus is initiated around these lossy particles and propagates outward from such particles.

For purposes of this invention, the term particle means a discontinuous phase in the resinous material and can be a solid or a fluid. Thus, dispersed droplets of a liquid are considered particles in accord with this invention.

The dielectrically lossy particle can be selected from a wide variety of materials depending upon the resinous composition to be cured. The primary requirement for selecting the lossy particle for purposes of this invention is that the dielectric constant of the lossy particle be substantially the same as the dielectric constant of the resin. Most resins of interest have a dielectric constant less than 10 in the frequencies of interest. Preferably the lossy particle has a dielectric constant less than 200 and more preferably less than 20 when measured at the same frequency range. Thus, the ratio of the dielectric constant of the lossy particle to the dielectric constant of the resin should be less than 100, preferably less than 10, and most preferably about 1.

Resins useful in the practice of this invention are any thermosetting resins such as, for example, polyurethanes, phenolics, polyesters, epoxies, and the like. Particularly useful are the polyesters.

The resinous composition can comprise the usual catalysts and also typical fillers and/or pigments such as, for example, glass fibers, calcium carbonate, carbon black, titanium dioxide, and the like, providing they do not interfere with the curing process. Such fillers can even lead to improved properties of the composites formed by acting as heat sinks, if not dielectrically lossy, and thus keeping the temperature of the composite below its degradation temperature.

Figure 3A:
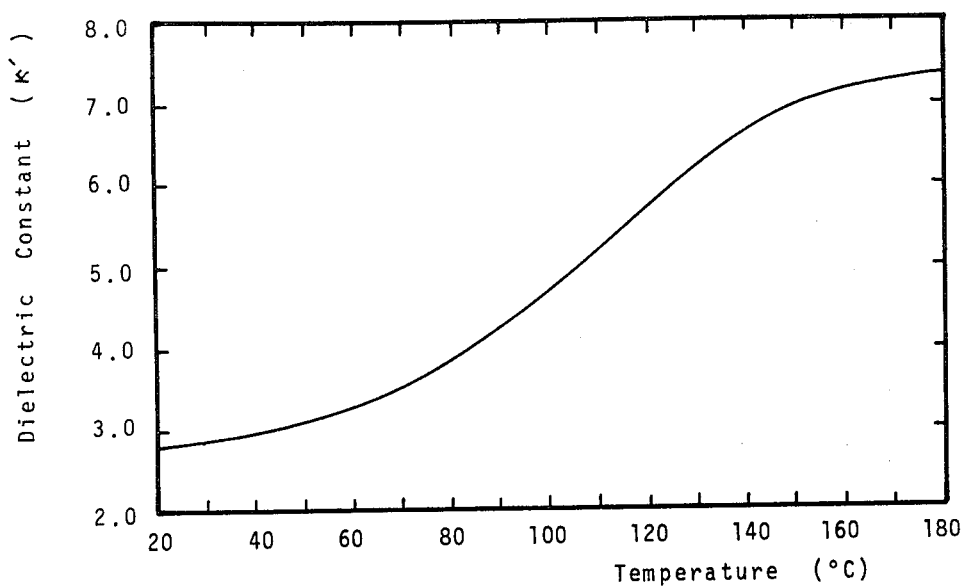
FIG. 3A is a graph illustrating the dielectric constant of polyvinylchloride (PVC) as a function of temperature at 27 MHz.
Figure 3B:
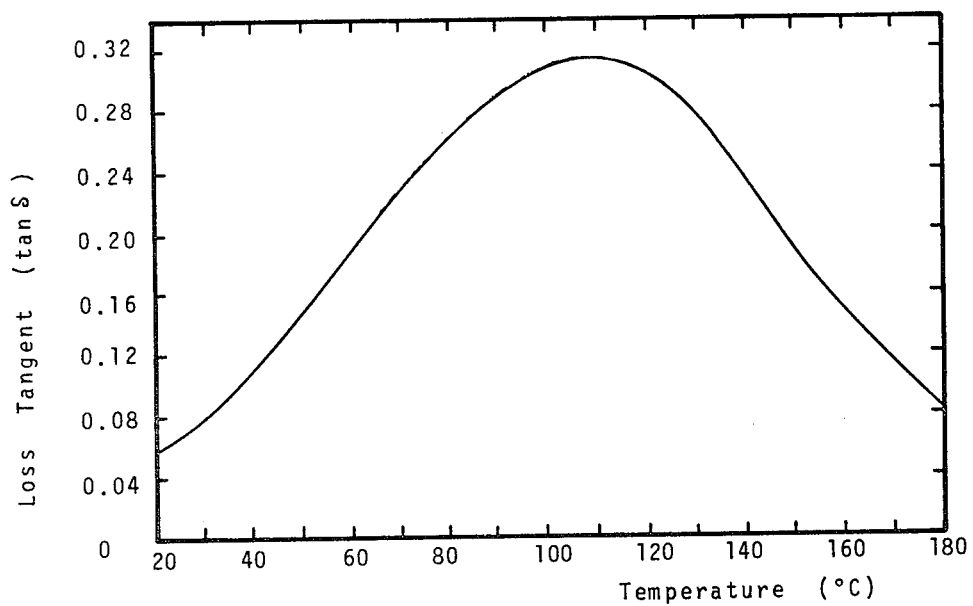
FIG. 3B is a graph illustrating the dielectric loss tangent of polyvinylchloride as a function of temperature at 27 MHz.
Figure 4A:
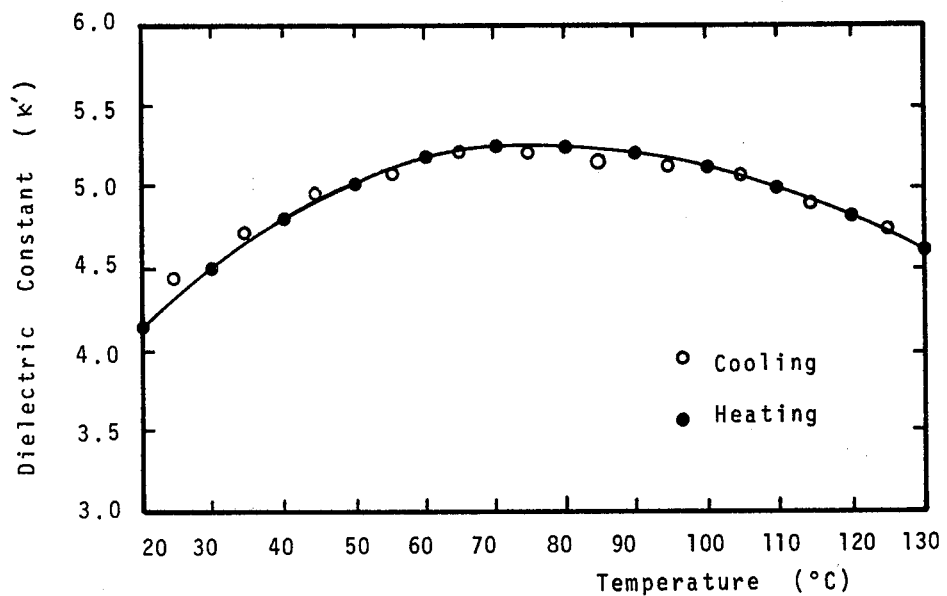
FIG. 4A is a graph illustrating the dielectric constant of a polyester resin as a function of temperature at 30 MHz.
Figure 4B:
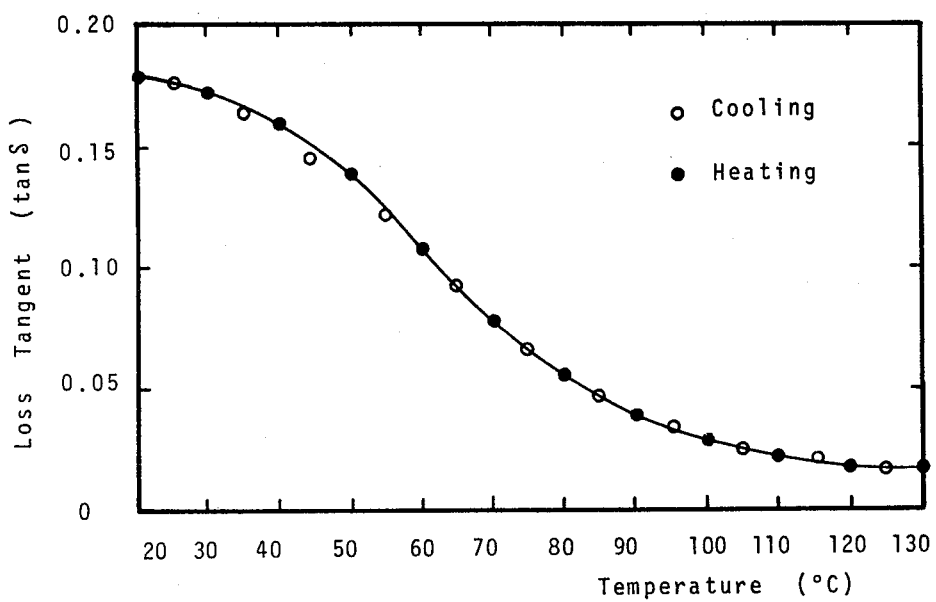
FIG. 4B is a graph illustrating the dielectric loss tangent of the same polyester resin as a function of temperature at 30 MHz.
Figure 5A:
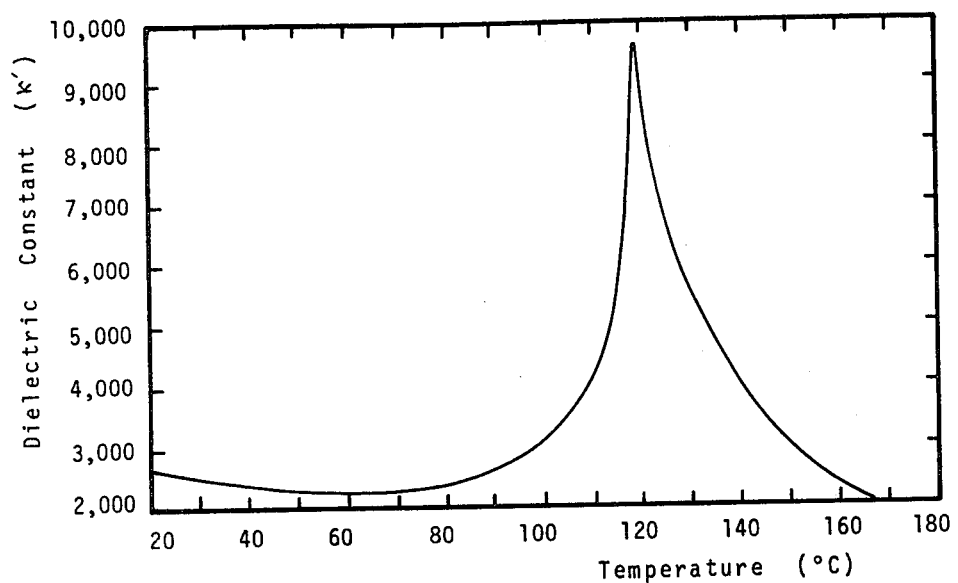
FIG. 5A is a graph illustrating the dielectric constant of barium titanate as a function of temperature at 10 MHz.
Figure 5B:
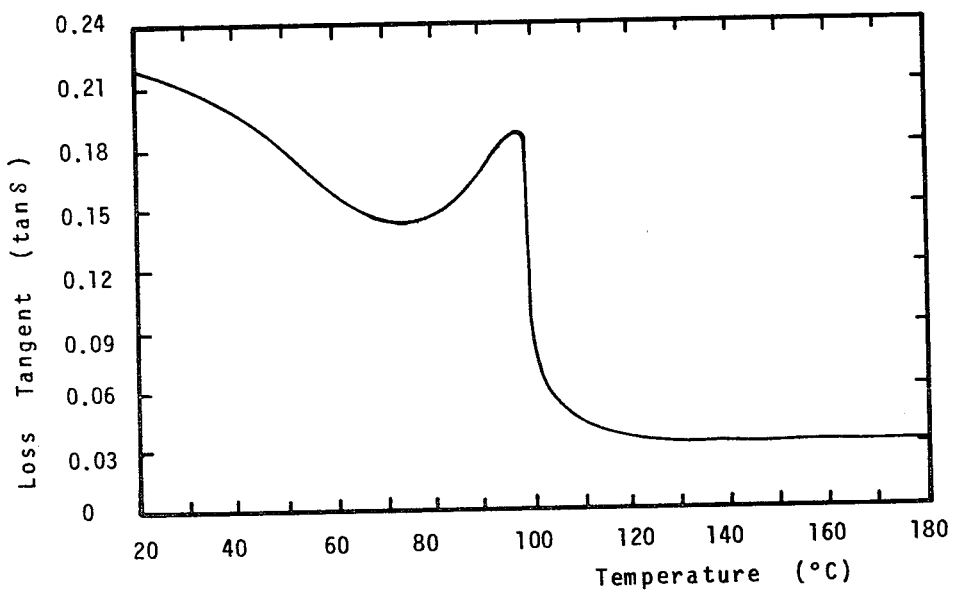
FIG. 5B is a graph illustrating the dielectric loss tangent of barium titanate as a function of temperature at 10 MHz.

A particularly useful lossy particle for the practice of this invention is polyvinylchloride. Although barium titanate is a lossy material, it is not useful in the practice of the present invention because its dielectric constant is too high compared to typical resins of interest for curing in accord with the process of this invention because the electric field is distorted by the high dielectric substances. Thus, the particle of barium titanate does not generate sufficient heat to initiate the curing reaction. Compare FIGS. 3A and 3B with FIGS. 4A and 4B versus FIGS. 5A and 5B and FIGS. 4A and 4B.

The lossy particle can also be provided by coating non-lossy or low-loss fibers and/or fillers with high loss materials.

A unique aspect of the process of this invention is that the exothermic reaction propagates from the heat sources (lossy particles) which have locally initiated the reaction. Under appropriate conditions, the cure exotherm may be sufficient to propagate a reaction front. Thus, the electric field can be shut off when the reaction rate becomes exponential reducing the energy required for curing.

The electric field must be of sufficient strength and alternated at sufficient frequency to generate the heat required in the lossy particle to initiate the curing reaction. The electric field must also be less than the electrical breakdown value of the composition. Generally, an electric field of at least 500 V/cm will be sufficient to practice the invention. However, higher electric fields will shorten cure times and thus reduce cycle times in the process. Typically useful electric fields will be in the range of about 500 V/cm to about 10,000 V/cm.

The frequency selected for the process may vary considerably depending upon the materials used, the shape of the article being formed, the size of the article, etc. Typically, frequencies in the dielectric and microwave frequency ranges are the most useful. Thus, frequencies in the range of from about 1 MHz to about 30 GiHz are generally used in the practice of this invention. Preferred frequency ranges are from 1 to about 100 MHz and from about 900 MHz to about 30 GiHz.

In accord with one embodiment, shaped articles in accord with this invention are molded under pressure in an alternating electric field, preferably in a dielectric field. The dielectric power supply, for example, is coupled through a high voltage electrode to a press assembly containing the mold. Typically, the entire press assembly is shielded. The press and shield are used as grounds and the capacitance of the high voltage electrode with respect to ground is minimized.

It is desirable to apply uniform electric fields to the shaped article to be cured. Although uniform heating of simple shapes such as flat plates is trivial, the general three-dimensional problem for uniform heating is quite complex.

The heat generated in a material is given by equation $$\dot{w} = 0.133 \, (\kappa' \tan \delta) \, (f) \, (E/d)^2$$

where
 $\dot{w}$ = energy absorbed (cal/cm³)(sec)
 $\kappa'$ = Relative loss factor
 $\delta$ = Loss angle
 f = field frequency (MHz)
 E/d = field strength (kV/cm)
indicates that the heating rate is proportional to the field strength squared. Any nonuniformities in the applied field are magnified in the corresponding heating rates. This nonlinear relationship is the primary reason the cure times vary as functions of field strength. Extending this idea, the fields curing a part can only be turned off after the last section has cured. If nonuniform fields are curing the part, then some sections will cure long before others. In these situations, the resulting inefficient cycle times generally are not nearly as important as the excessive temperatures generated in the regions with the highest fields.

At the locations where the field strength is higher, curing takes place rapidly followed by a period where the cured composite experiences additional heating. Even after accounting for the decrease in dielectric loss accompanying curing, excessive temperatures above the composite's degradation temperature are usually generated in these regions. Excessive temperatures are particularly a problem when attempts are made to minimize cycle times by applying higher average fields. Reducing field nonuniformities will permit higher average fields to be applied. Because of the disproportionate time-temperature rise trade-off, significantly shorter cure times will result.

The prefered methods for curing resins in accord with this invention use dielectric or microwave energy. Inherent differences between these two methods make one approach preferable to the other in some applications. The best approach to uniformly heating three-dimensional parts should be based on the intrinsic differences, rather than on an evaluation of the current state of the art.

One difference between microwave and dielectric heating is how the heat is applied. Almost without exception, microwave heaters use resonating cavities and dielectric heaters use high voltage electrodes. The microwave cavity acts to contain microwaves which have been fed in from a generator via a waveguide. These waves keep bouncing off the cavity walls until they are absorbed by materials in the cavity. In contrast, dielectric heaters apply a fixed alternating field across the work material. The difference in these methods relates to the wavelengths at the particular frequencies. There is no fundamental reason why a dielectric cavity could not be built. Limitations with this approach lie in the size of the resulting cavity and the ability to obtain high heating rates. However, to obtain uniform heating in the cavity, numerous resonant modes must exist which require the largest dimension of the cavity to be at least several wavelengths. The enormous size of a dielectric cavity limits the number of applications, but it still may be appropriate for large parts. A limitation arises from the maximum heating rate this approach can handle. The heating rate is proportional to the dielectric loss, frequency, and electric field squared. In both the dielectric and microwave cavities, arcing considerations limit the electric field strength. In most materials, the dielectric loss is a weak function of frequency so the heating rate will be proportional to the frequency. Because of more than an order of magnitude difference in frequencies, higher heating rates are presently possible in microwave cavities. Acceptable heating rates are possible in microwave cavities. Acceptable heating rates are presently possible with dielectric electrodes but not generally with cavity approaches because electrodes can support higher field strengths without arcing.

The penetration of electric fields is also a function of frequency. The governing relation for a traveling electromagnetic (TEM) wave entering a lossy medium is, $$\frac{E(x)}{E(o)} = e^{-\Gamma x}$$

with $\Gamma = \frac{2\pi}{\lambda_o} [\frac{1}{2} \kappa'\{\sqrt{1 + \kappa''} - 1\}]^{\frac{1}{2}}$ where
 E(x) = Electric field intensity at depth x
 E(o) = Incident electric field intensity
 $1/\Gamma$ = Attenuation distance in which field decays to 1/e of its original value
 $\lambda_o$ = Wavelength at frequency of interest
 $\kappa'$ $\kappa''$ = Material dielectric properties Note that because of $1/\lambda_o$, the penetration is less at higher frequencies. The decrease in power absorption will be given by the field strength reduction squared. Negligible reduction in field strength are observed for microwaves penetrating into the half-thickness of most parts. On the other hand, appreciable absorption may occur when fields travel through a part's long dimensions. This equation is not applicable to the dielectric electrode case because there the electrode separation is only a small fraction of the wavelength. At dielectric frequencies, uniform penetration may be assumed.

The power requirements for initiating curing are identical for both dielectric and microwave fields. The fields are simply being used to heat the composite or some of its components. The power input required to heat at various rates is related to the volume being heated.

When using a dielectric field to cure a complex shape multiple electrodes preferably are placed around the shape to obtain the desired uniform heating. Electrode placement is by trial and error. Variations in electrode position, shape, and voltage may be used to obtain uniform fields.

In another embodiment, a dielectric electrode can be scanned across the article being molded. By either changing the relative velocity as a function of position or scanning at a constant rate and varying the electrode voltage, variable fields can be applied to uniformly heat the part. Using a localized high voltage electrode and ground will have the advantage of concentrating the field.

Another approach to providing uniform heating of the article is to use mold compensation. The reason flat plate electrodes will not uniformly heat a variable thickness part is that the complex permittivities of the mold material and part are different. On the other hand, identical properties are not desirable because the mold would heat up as much as the part. Fortunately, the required constant field condition may be approximated without identifical properties, resulting in the mold compensation approach.

The relation between part and mold dielectric properties required for uniform fields is:

$$(\kappa_1')^2 + (\kappa_1'')^2 = (\kappa_2')^2 + (\kappa_2'')^2$$

where
$\kappa_1' + j\kappa_1'' =$ Mold complex permittivity
$\kappa_2' + j\kappa_2'' =$ Part complex permittivity
For most materials, $\kappa_i' >> \kappa_i''$, in which case the above equation simplifies to, $$\kappa_1' = \kappa_2'$$

That is, simply matching the dielectric constants will result in approximately uniform fields, neglecting phase differences. Using a mold material with matching dielectric constant but very low loss tangent is the preferred situation.

The mold compension criterion expressed by the above equation was derived for two flat plate electrodes. The thickness of the mold material may also be considered an independent parameter. In this case, the condition for uniform fields is, $$L_1 = \frac{dL_2 + d(L_2 - d)(1 - \xi)}{L_2(1 - \xi) + d\xi}$$

where
$L_2 =$ Thickness of sample between electrodes
$L_1 =$ Thickness of mold material plus sample
$d =$ Thickness of sample in series with mold material $$\xi = \frac{(\kappa'_1)^2 + (\kappa''_1)^2}{(\kappa'_2)^2 (\kappa''_2)^2}$$

$\kappa_1', k_1'' =$ Sample dielectric properties
$\kappa_2', \kappa_2'' =$ Mold dielectric properties This approach makes it slightly easier to match mold dielectric properties, but segmenting the electrodes makes it less adaptable than using flat electrodes.

The mold compensation technique is preferred over the other dielectric methods because it is very adaptable. Molds simply need to be machined to the desired shape and fields applied to flat electrodes. This approach avoids the problems of electrode positioning and varying electrode velocity or voltage. The method generally requires that no metal be used in the mold.

Articles can also be heated and cured at microwave frequencies. One embodiment involves placing the article in a metal cavity and feeding in microwaves. Because the article is molded under pressure, a mold transparent to microwaves is used. This method using microwaves has high adaptability and can provide very uniform fields. Uniform fields are usually obtained in microwave cavities by mixing up the standing waves with a metallic fan. While not removing the wave nodes, the fans keep the nodes moving continuously producing approximately uniform fields.

In another embodiment the microwave cavity is the mold itself made of metal. The microwaves are fed into the mold through transparent ports located to permit uniform heating.

Microwaves can also be scanned across a mold. The microwaves emit from a horn arrangement which can be designed so as to concentrate the traveling waves in a small region. The horn is scanned relative to the part and either the scanning rates varied or the microwave power adjusted as a function of position. To contain the microwaves, it is necessary to surround this operation with a metallic chamber.

The following examples are provided to further illustrate the invention. In the examples, the resin used is Laminac 4123, a general purpose resin made from propylene glycol, phthalic anhydride, maleic anhydride, and styrene monomer, which is available from U.S. Steel Chemicals Division. The resin curing is catalyzed with t-butyl perbenzoate using two percent by weight based on the resin.

Figure 1:
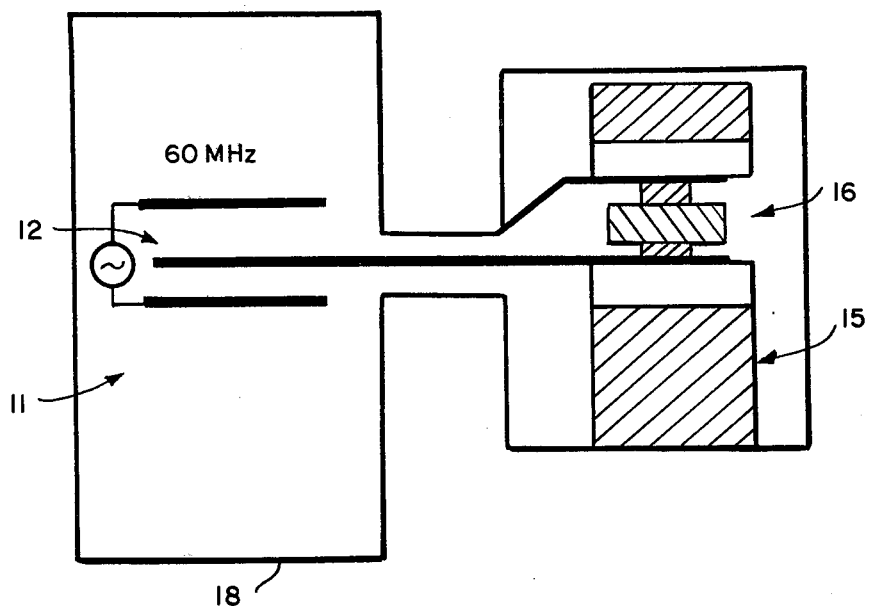
FIG. 1 is a schematic drawing illustrating a dielectric molding apparatus useful in the practice of the present invention.

Samples were molded under pressure in dielectric fields of approximately 60 MHz. The arrangement used is illustrated in FIG. 1. The dielectric power supply 10 was a Thermall 67CM, 13.5K watt heater built by La-Rose Corporation. This device was coupled through a high voltage electrode 12 to a seven-ton press 15 made by Carver, Inc. containing a mold 16. To contain the electric fields, the entire press assembly was shielded by constructing an aluminum box 18 around it. Coupling the press to the power supply required minimizing the capacitance of the high voltage electrode with respect to ground. The press and any shielding act as grounds. Consequently, the high voltage electrode was made as short as possible; and the shielding in the region between press and generator expanded to reduce the capacitance there.

To electrically insulate the high voltage electrode from one of the press platens, a 10 cm thick block of polypropylene was attached to the upper press platen. The high voltage electrode pressed against this block during molding. With an electrode area of 110 cm in contact with the block, and loads no greater than 4000 kg applied, no significant deformation occurred in the polypropylene.

To concentrate the field in the molding area and reduce overall capacitance, the lower platen was partially insulated from the ground portion of the mold by a thin sheet, 0.08 cm, of polytetrafluoroethylene (PTFE). The electric field was grounded at the mold by directly connecting it to the generator via a flexible copper mesh. With this setup, the electric field was no longer required to travel through the press and aluminum box shielding the press before it was grounded at the generator.

Figure 2:
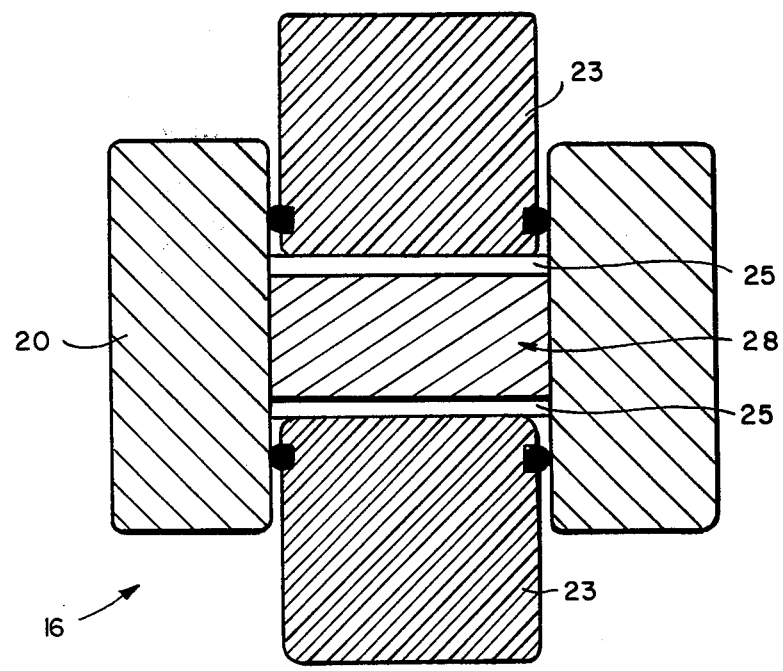
FIG. 2 is a cross-sectional view of a mold useful in a dielectric curing process in accord with the present invention.

The mold 16 used to form samples, flat disks 4.5 cm in diameter, is illustrated in FIG. 2. The outer section 20 is a glass filled PTFE, type RT/duroid 5870M, supplied by Rogers Corporation. This material has very low dielectric loss, can withstand molding temperatures in excess of 320° C., and deformed negligibly under the molding pressures used. The outer dimensions of the mold are 6.4 cm high by 10 cm in diameter. This PTFE mold was filled with two aluminum plugs, each containing a rubber O-ring to prevent the resin samples from leaking out under pressure. One of the aluminum plugs contacts the high voltage electrode while the other is grounded. It is preferred that all corners on the aluminum plugs be well rounded to prevent arcing. To obtain uniform curing, 0.16 cm PTFE disks 25 were inserted between the sample 28 and aluminum plugs 23, as shown in FIG. 2. This technique proved effective in thermally insulating the sample.

The basic components of the samples molded were equal volumes of polyester resin, glass fibers, and calcium carbonate. The volume percents of these three components were reduced equally in samples containing lossy fillers, i.e. polyvinylchloride (PVC) in these examples. The polyester resin used, Laminac 4123 catalyzed with two percent t-butyl perbenzoate, is described above. However, it will be appreciated that any thermosetting resin can be used in the practice of this invention. One-eighth inch glass fibers, type 308A, supplied by Johns-Manville Corporation were used. The calcium carbonate used was No. 10 White, supplied by Georgia-Marble Corporation. When the lossy filler PVC was used, it was type VC100-PM supplied by Borden Chemicals. Samples were made by first weighing in and mixing together all of the dry components. The resin and catalyst were then added and mixed thoroughly by hand. The resulting material was kept refrigerated until several hours before it was molded.

Fifty gram samples, forming disks approximately 2 cm thick, were weighed into the mold which was then placed in the press. After pressure had been applied and the shielding aluminum box closed, the electric field was turned on for a specified length of time. Subsequent to turning the field off, the sample was kept under pressure for an additional 1 to 100 seconds. Only after this waiting period was the sample quickly demolded on an Arber press and its state of cure visually determined.

EXAMPLE 1

Discs containing 1% lossy PVC were molded and cured using an applied field of approximately 2500 V/cm. The time to reach a degree of cure of 0.9 was found to be about 13–20 seconds.

EXAMPLE 2

Figure 6:
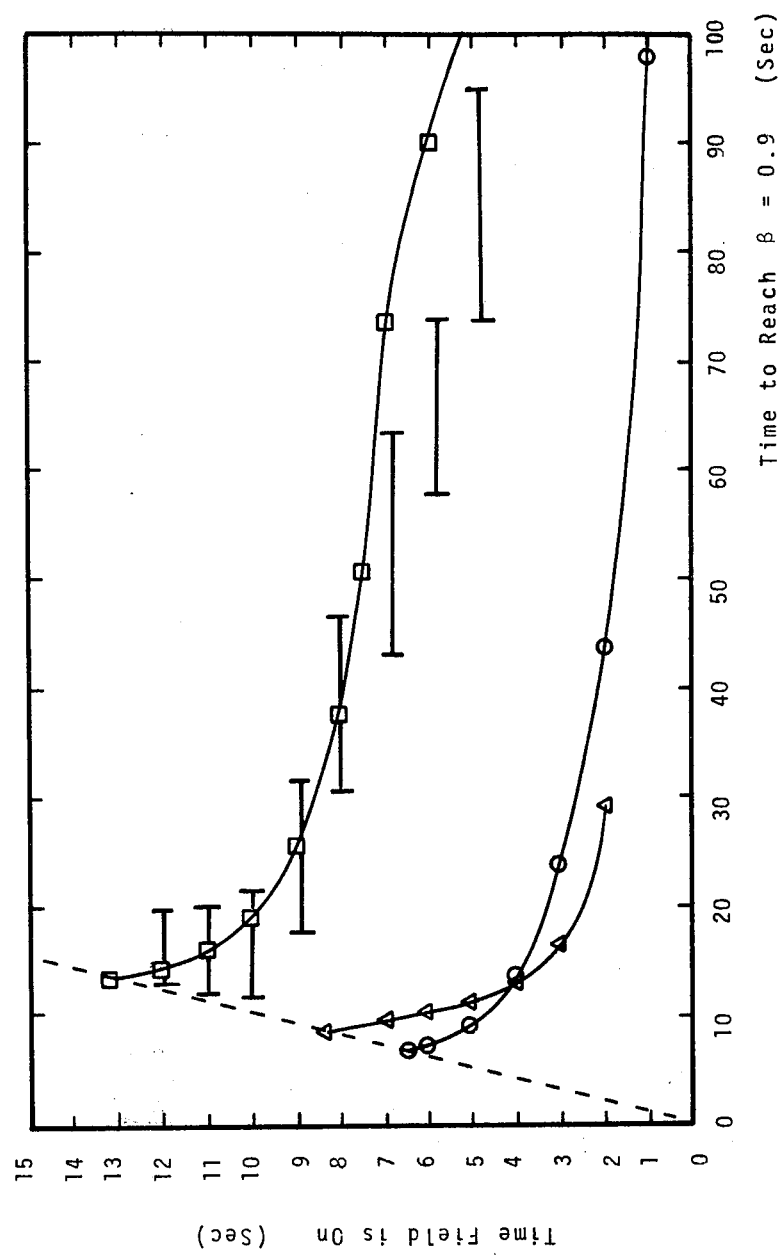
FIG. 6 is a graph illustrating the relationship between the time a field is applied to the sample and the time required to reach 0.9 degree of cure for a polyester resin have 1% lossy PVC particles at 2500 v/cm.

Discs containing 1% lossy PVC were made using an applied field of 2500 V/cm, turning off the field after various predetermined times, and determining how long it takes to reach 0.9 degree of reaction. The results are illustrated in FIG. 6.

This invention has been described in detail with reference to the preferred embodiments thereof. However, it will be appreciated that those skilled in the art upon reading this disclosure may make modifications and improvements within the spirit and scope of this invention.

We claim:

1. A method for curing a resinous composition comprising an admixture of a thermosetting resin and dielectrically lossy particles, said lossy particles having a dielectric constant substantially the same as the dielectric constant of the resin, said method comprising subjecting said admixture to a high frequency alternating electric field for sufficient time to heat the lossy particles and initiate the chemical reaction to cure the resin.

2. The method of claim 1 wherein the admixture is placed in a mold and maintained under pressure during the period required to cure the resin.

3. The method of claim 1 wherein the electric field has a strength of at least 500 V/cm in the admixture.

4. The method of claim 1 wherein the electric field strength is at least 2000 V/cm.

5. The method of claim 1 wherein said electric field induces substantially uniform heating of the admixture.

6. The method of claim 1 wherein the electric field has a frequency of at least about 1 MHz.

7. The method of claim 1 wherein the electric field as a frequency in the range of from about 1 to about 100 MHz.

8. The method of claim 1 wherein the electric field has a frequency in the range of from about 900 MHz to about 30 GiHz.

9. The method of claim 1 wherein the resin is a polyester.

10. The method of claim 1 wherein the lossy particles are present in the admixture in an amount of at least about 1% by volume.

11. The method of claim 1 wherein the lossy particles are present in the admixture in an amount of from about 1% to about 10% by volume.

12. The method of claim 1 wherein said lossy particles comprise polyvinylchloride.

13. The method of claim 1 wherein said resin additionaly comprises non-lossy fillers or pigments.

14. The method of claim 1 wherein said lossy particles comprise a non-lossy particle coated with a highly lossy material.

15. The method of claim 1 wherein the ratio of the dielectric constant of the lossy particle to the dielectric constant of the resin is less than about 10.

16. The method of claim 15 wherein said ratio is about 1.

* * * * *